(12) United States Patent
Arend

(10) Patent No.: US 7,418,628 B2
(45) Date of Patent: Aug. 26, 2008

(54) SYSTEMS AND METHODS FOR IDENTIFYING SOLUTIONS TO COMPUTER PROBLEMS USING CONTEXTS AND VERSIONS

(75) Inventor: Thomas Arend, Mannheim (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 10/522,526

(22) PCT Filed: Sep. 15, 2003

(86) PCT No.: PCT/EP03/10246

§ 371 (c)(1),
(2), (4) Date: Oct. 18, 2005

(87) PCT Pub. No.: WO2004/040510

PCT Pub. Date: May 13, 2004

(65) Prior Publication Data

US 2006/0095392 A1    May 4, 2006

(30) Foreign Application Priority Data

Oct. 31, 2002    (EP) .................................. 02024530

(51) Int. Cl.
*G06F 11/00* (2006.01)
(52) U.S. Cl. ....................................................... 714/26
(58) Field of Classification Search .................. 714/26, 714/57, 46
See application file for complete search history.

(56) References Cited

U.S. PATENT DOCUMENTS

| | | | |
|---|---|---|---|
| 5,111,384 A * | 5/1992 | Aslanian et al. ................ | 714/26 |
| 5,317,725 A | 5/1994 | Smith et al. | |
| 5,404,503 A | 4/1995 | Hill et al. | |
| 5,960,200 A | 9/1999 | Eager et al. | |
| 5,983,364 A | 11/1999 | Bortcosh et al. | |

(Continued)

FOREIGN PATENT DOCUMENTS

EP    1 416 439 A1    5/2004

(Continued)

OTHER PUBLICATIONS

Shutt, T. S. et al., "COPRA: Computer Operations Problem Resolution Assistant", Proceedings of the Conference on Artificial Intelligence for Applications, Orlando, Los Alamitos, IEEE Comp. Soc. Press, US, vol. Conf. 9, pp. 107-113, (Mar. 1-5, 1993).

(Continued)

*Primary Examiner*—Scott T Baderman
*Assistant Examiner*—Paul F Contino
(74) *Attorney, Agent, or Firm*—Finnegan, Henderson, Farabow, Garrett & Dunner, L.L.P.

(57) ABSTRACT

A computer system includes a main system that executes an application in cooperation with a human user. An auxiliary system evaluates problems that occur in the main system. The auxiliary system includes a service module that collects problem related data from the main system, an acquisition module that acquires knowledge representations, a knowledge module that stores knowledge representations, an inference module that processes problem related data with knowledge representations to identify solutions and that forwards the solutions through the service module to the main system. The auxiliary system distinguishes a context of the problems and distinguishes versions of the main system.

16 Claims, 15 Drawing Sheets

U.S. PATENT DOCUMENTS

| | | |
|---|---|---|
| 6,098,061 A | 8/2000 | Gotoh et al. |
| 6,236,989 B1 | 5/2001 | Mandyam et al. |
| 6,237,114 B1 | 5/2001 | Wookey et al. |
| 6,260,048 B1 | 7/2001 | Carpenter et al. |
| 6,263,333 B1 | 7/2001 | Houchin et al. |
| 6,295,525 B1 | 9/2001 | Hart et al. |
| 6,360,216 B1 | 3/2002 | Hennessey et al. |
| 6,460,070 B1 | 10/2002 | Turek et al. |
| 6,647,383 B1 | 11/2003 | August et al. |
| 6,877,115 B2 | 4/2005 | Herman |
| 7,080,287 B2 | 7/2006 | Salem |
| 2001/0056379 A1 | 12/2001 | Fujinaga et al. |
| 2002/0073200 A1 | 6/2002 | Babutzka et al. |
| 2002/0099563 A1 | 7/2002 | Adendorff et al. |
| 2002/0133347 A1 | 9/2002 | Schoneburg et al. |
| 2004/0143777 A1 | 7/2004 | Arend |
| 2004/0153791 A1 | 8/2004 | Arend |
| 2004/0153881 A1 | 8/2004 | Arend |

FOREIGN PATENT DOCUMENTS

| | | |
|---|---|---|
| WO | WO 97/15009 | * 10/1996 |
| WO | WO 98/53396 | 11/1998 |
| WO | WO 00/68793 | 11/2000 |
| WO | WO 01/18652 | 3/2001 |

OTHER PUBLICATIONS

Freiling, M., "Designing an Inference Engine: From Ontology to Control", International Workshop on Artificial Intelligence for Industrial Applications, May 25, 1988, pp. 20-26.

Grillmeyer O., et al., "The Design and construction of a Rule Base and an Inference Engine for Test System Diagnosis", International Test Conference Washington, IEEE Comp. Soc. Press, US, vol. SYMP. 1985, Nov. 1, 1985, pp. 857-867.

U.S. Appl. No. 10/697,433, filed Oct. 31, 2003, entitled "Identifying Solutions to Computer Problems in Main System by Service System."

U.S. Appl. No. 10/697,431, filed Oct. 31, 2003,, entitled "Identifying Solutions to Computer Problems in Client/Server System."

U.S. Appl. No. 10/697,434, filed Oct. 31, 2003, entitled "Identifying Solutions to Computer Problems in Main System by Service System in Distributed System Landscape."

"Semantic Mediation for Cooperative Spatial Information Systems: the AMUN data model," Leclercq, IEEE, May 1999.

* cited by examiner

ACQUISITION MODULE 320

SOLUTION IDENTIFIER

SET OF ADVICES

R TO APPLY

R1, R2, R3

R1, R21, R21, R31, R32

IF THEN

Q1, Q2, Q3 RESERVOIR

LANGUAGE ANALYZER

INFERENCE MODULE 340

FIG. 6

FIRST DISTRIBUTED SYSTEM LANDSCAPE

SECOND DISTRIBUTED SYSTEM LANDSCAPE

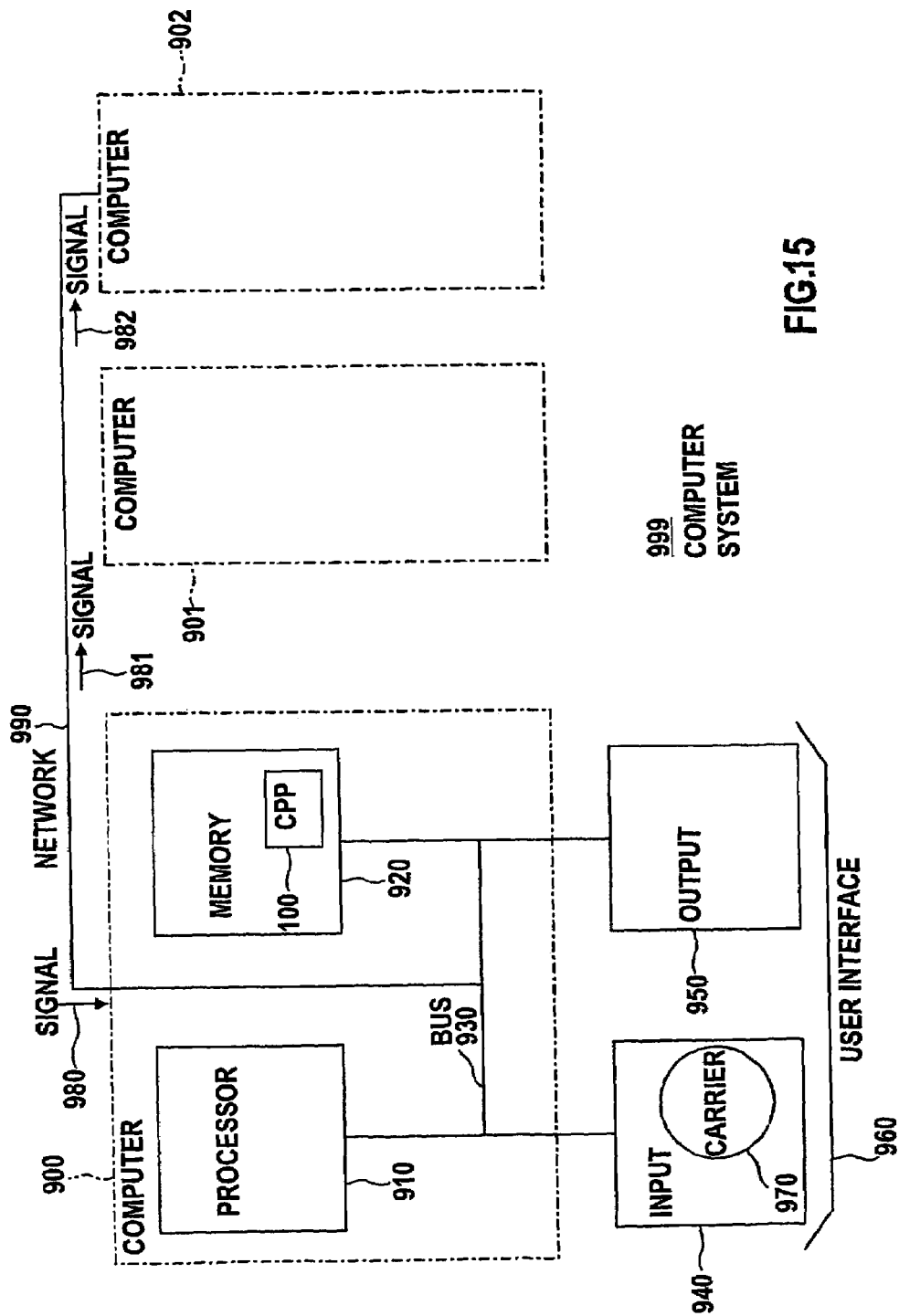

SYSTEMS AND METHODS FOR IDENTIFYING SOLUTIONS TO COMPUTER PROBLEMS USING CONTEXTS AND VERSIONS

This application is a national stage filing under 35 U.S.C. § 371 of International Application No. PCT/EP2003/010246, filed Sep. 12, 2003, which published in the English language, which claims priority to EP 02024530.4, filed Oct. 31, 2002.

FIELD OF INVENTION

The present invention generally relates to data processing by computer systems, programs, and methods. More particularly, the invention relates to evaluating and solving problems. The computer systems are distinguished into main, auxiliary and service systems.

BACKGROUND

Electronic data processing uses integrated and distributed computer systems with complex architecture. Coupling different computers over networks (e.g., Internet) enhances functionality but adds complexity and increases maintenance.

Each computer system operates in the complexity of hardware (e.g., computers and network) and software (e.g., operating systems, applications, databases).

Problems are deviations from the predefined operation of the computer system that are caused by malfunction of hardware or software or by improper input by the user. To name a few examples, components like processors suddenly fail, applications occasionally provide wrong results, and users sometimes manipulate data.

Problems often remain hidden from the user. Once detected, the user engages in problem solving. For example, the user reads documentation papers, activates help functions (e.g., predefined advices, often obtained via online services), looks up in databases to identify advices ("notes"), makes experiments, or tells problem symptoms to specialists (e.g., through phone hotline, email, Internet portal).

A majority of users relies on passive assistance; only a minority actively solves the problem. There are further challenges: For example, sensitive data remains with the authorized user but is shielded from specialists (data protection); users and specialists might introduce further errors. In any case, problem solving remains time consuming and expensive.

Further, heterogeneous system landscapes have systems that differ for example, by manufacturer, release version, and application. Each difference increases the number of potential problems and corresponding solutions. Selecting solutions becomes critical.

There is a need to improve problem solving by mitigating disadvantages of the prior art.

BRIEF DESCRIPTION OF THE DRAWINGS

The accompanying drawings, which are incorporated in and constitute a part of this specification, illustrate embodiments of the invention and together with the description, serve to explain the principles of the invention.

FIG. 6 illustrates an inference module in the auxiliary system with more detail;

FIG. 15 illustrates a simplified block diagram of a computer system in general for that the present invention can be implemented.

DETAILED DESCRIPTION

An exemplary implementation for the invention uses the well-known system R/3. R/3 is commercially available from SAP Aktiengesellschaft Walldorf (Baden, Germany, "SAP"). Organizations (i.e. SAP customers) use enterprise resource planning applications ("ERP applications", or "business applications") to organize information in a variety of fields, such as supply chain management (SCM), customer relationship management (CRM), financials, human resources (HR), enterprise portals, exchanges, technology, product lifecycle management (PLM), supplier relationship management (SRM), business intelligence, business intelligence, mobile business, hosted solutions, small and midsize business, and industry solutions.

ABAB/4 is the well-known programming language used by SAP to define transactions for applications. R/3 and ABAB/4 is documented by a variety of reference books, such as:

Gareth M. de Bruyn, Robert Lyfareff, Ken Kroes: "Advanced ABAP Programming for SAP". Prima Publishing 1999. ISBN 0-7615-1798-7.

Bernd Matzke: "Programming the SAP R/3 System". Addison-Wesley, 1997. ISBN 0-201-92471-4.

Jonathan Blain, ASAP World Consultancy: "Special Edition Using SAP R/3, Third Edition. Que. 1999. ISBN 0-7897-1821-9.

A detailed description of a computer system in general and a list of reference numbers are provided as the end of the specification.

In short, according to the invention, a computer system has a main system to execute an application (A) in cooperation with a human user and has an auxiliary expert system to evaluate problems (P) in the main system. Optionally, the problems are solved by predefined instructions.

The auxiliary system uses knowledge representations (R) in primary and secondary contexts. The auxiliary system distinguishes versions of the main system and—optionally—versions of the application (A). Knowledge representations (R) are classified into context groups.

The present invention enables the user to actively solve problems in the main system mostly without asking for advice by human specialists. Applying the invention saves time and quickly returns the main system back to normal operation. Applying further features effectively escalates problem evaluation to the service system. Involving human specialists (often expensive) is only required as a last remedy.

Figure 1:
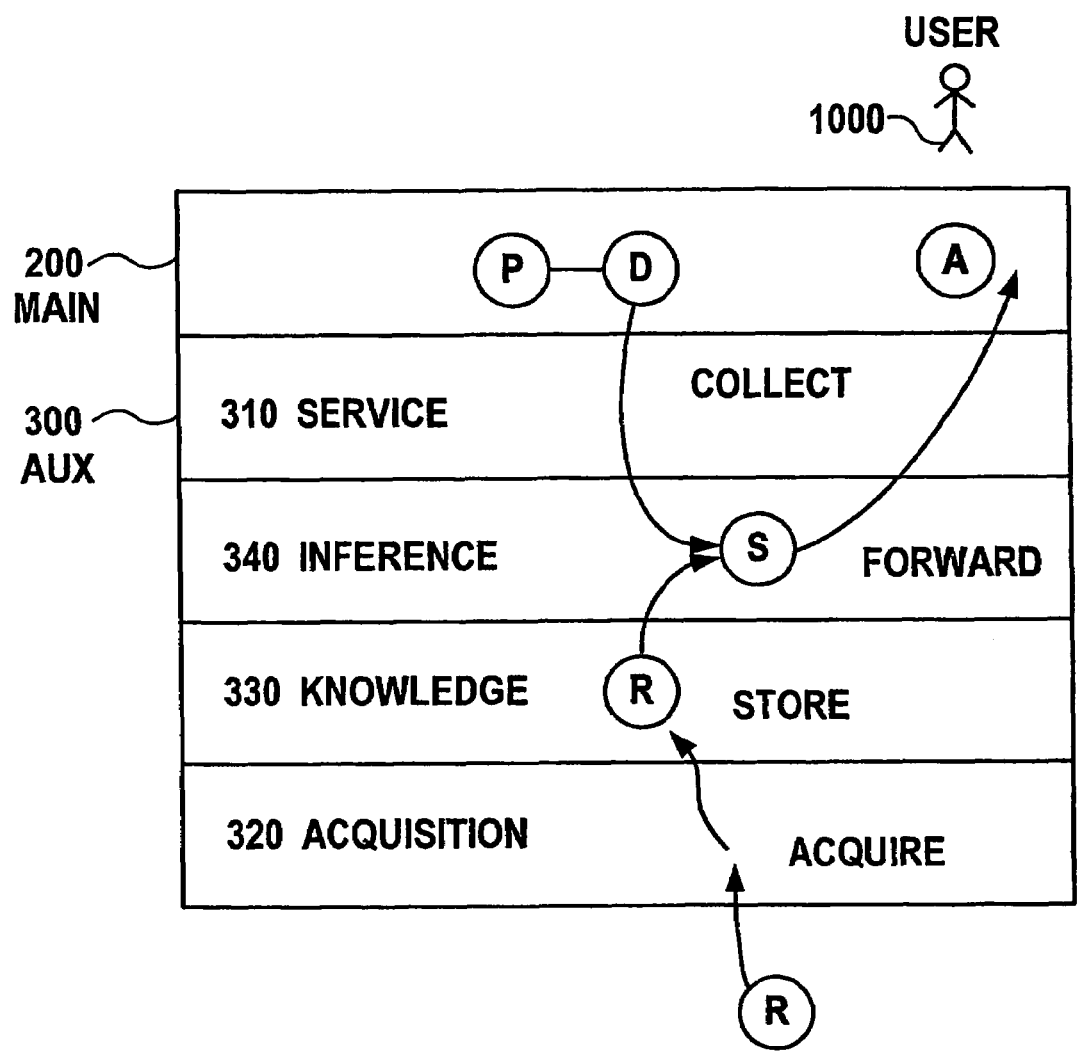
FIG. 1 illustrates a simplified block diagram of a computer system with a main system and an auxiliary system according to the present invention.

FIG. 1 illustrates a simplified block diagram of a computer system with main system 200 and auxiliary system 300 according to the present invention.

Computer system 200/300 has main system 200 to execute application A in cooperation with human user 1000. Auxiliary system 300 evaluates problems P in main system 200. Auxiliary system 300 has service module 310 to collect problem related data D from main system 200, acquisition module 320 to acquire knowledge representations R, knowledge module 330 to store knowledge representations R, inference module 340 for processing problem related data D with knowledge representations R to identify solutions S and for forwarding the solutions S through service module 310 to main system 200. Throughout the modules, auxiliary system considers context and versions (of main system 200 and application A).

Auxiliary system 300 finds problem related data D by evaluating the problem environment in main system 200: date, time, memory usage, data objects, software modules of application and operating system and the like.

Figure 2:
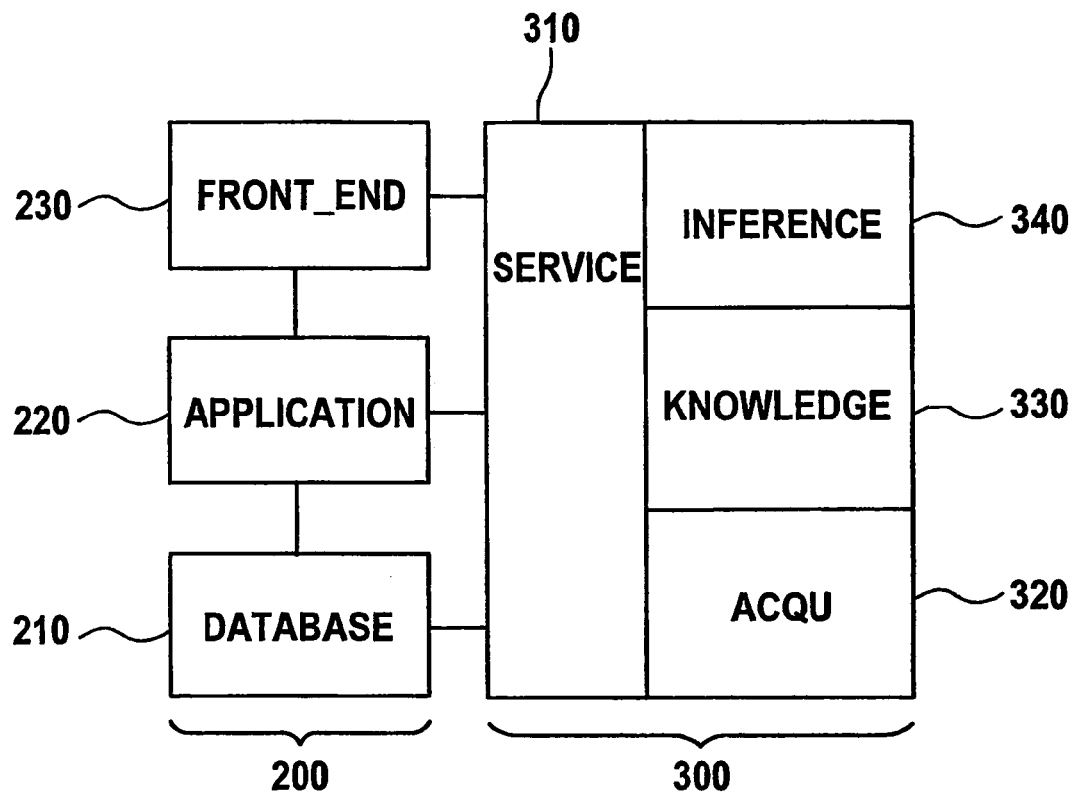
FIG. 2 illustrates the system of FIG. 1 with more detail.

FIG. 2 illustrates main system 200 and auxiliary systems 300 with more detail. Main system 200 has a client/server configuration with database 210 (preferably, relational database), application server 220 and front-end server 230.

The following refers to an exemplary implementation: Main system 200 and auxiliary system 300 are implemented by an R/3 type system. System 200 performs an ERP application. The ERP application is defined by instructions that have common keywords, common syntax and common semantic with environments selected from the group of: ABAB/4, Java 2 Platform Enterprise Edition (J2EE), and .NET framework. Auxiliary system 300 uses the client/server configuration (210, 220, 230) of main system 200: the modules of auxiliary system 300 are distributed such that service module 310, acquisition module 320, knowledge module 330, inference module 340 are arranged in parallel to application server 220 and to database 210. Front-end server 230 operates as user-interface both for main system 200 and auxiliary system 300. In other words, database 210 implements a storing function, application server 220 implements the application (A, cf. FIG. 1) and front-end server 230 implements presentations (e.g., user interface). The module distributions can be modified. For example, knowledge module 330 can be part of database 210. Internet communication is used between application server 220 and front-end server 230. Internet communication is implemented by well-known techniques (e.g., TCP/IP, HTML, and HTTP).

Having introduced main system 200 and auxiliary system 300 in general, the following sections describe the modules with more detail.

Figure 3:
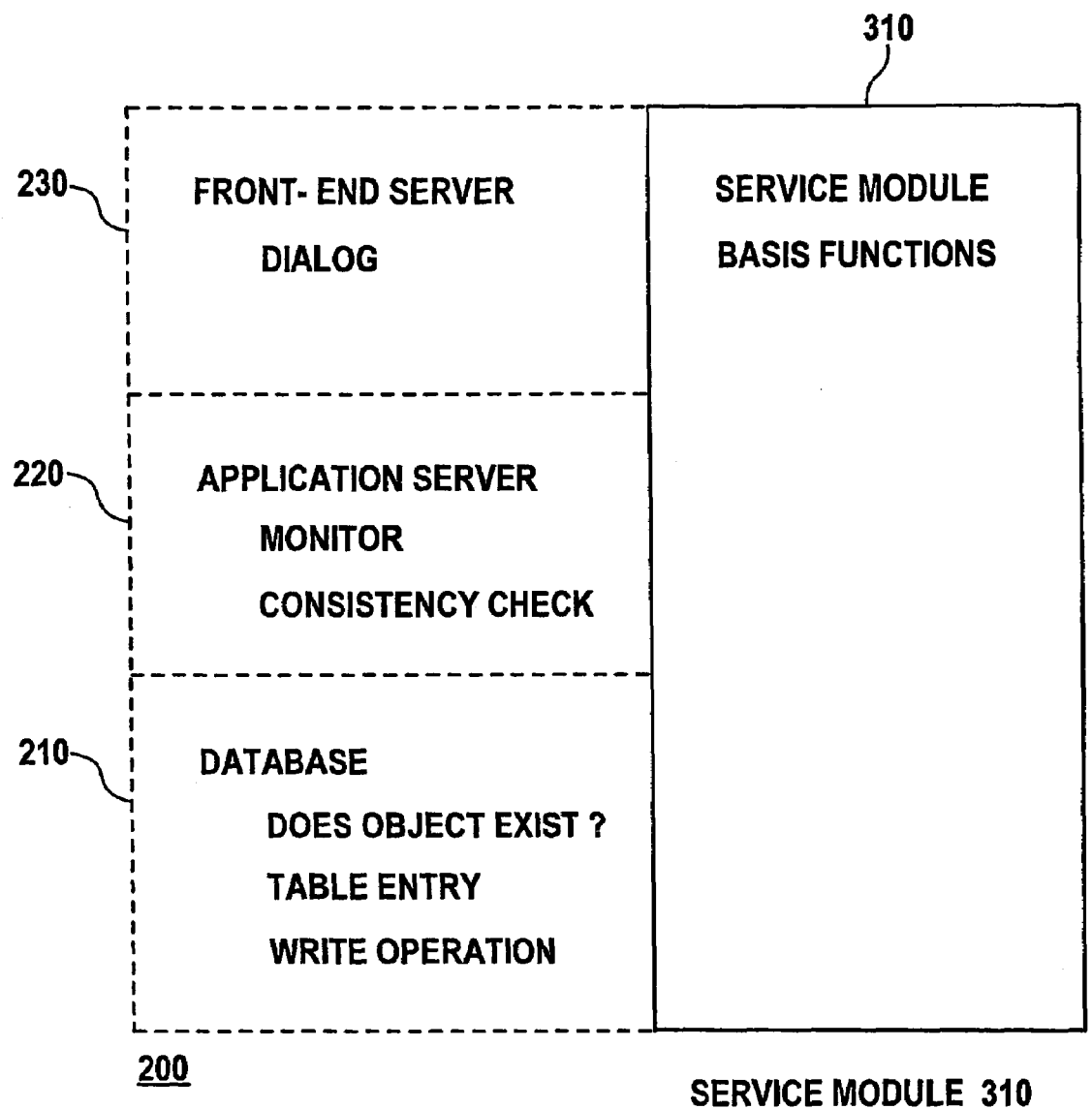
FIG. 3 illustrates a service module in the auxiliary system with more detail.

FIG. 3 illustrates service module 310, especially its cooperation with main system 200 (dashed frame) in the exemplary implementation. Service module 310 makes basis service functions of main system 200 available for auxiliary system 300 (cf. FIG. 2). Basis service functions are: ABAP/4 workbench, administration, authorizations, batch input, data dictionary, dialog control, framework, graphical user interface, application program interface, and job. Basis services are explained in the above-cited reference books.

Service module 310 cooperates with main system 200 to obtain problem related data D for auxiliary system 300. Service module 310 cooperates with database 210 to test the existence of objects: The problem related data D comprises information about existence and non-existence of the objects. The objects are related to application A (in server 220).

Service module 310 cooperates with database 210 to obtain the content of a table entry as problem related data D. Service module 310 records events in the operating system of main system 200 by writing to database 210. Service module 310 records problem related data D obtained from data consistency check operations of main system 200 (e.g., application server 220). Consistency checks determine consistency (non-consistency) of data in database 210, especially in the database tables: Entries in the table-body should be consistent with the entries in the table-header. For example, the body holds zip-code numbers below headers "zip-code". Service module 310 instructs front-end server 230 to provide dialogs with user 1000. Service module 310 provides remote function call (RFC) connections with further auxiliary systems (with similar modules), such as with a service system (cf. FIG. 6).

Service module 310 monitors application server 220 and database 210 according to instructions from inference module 340.

Figure 4:
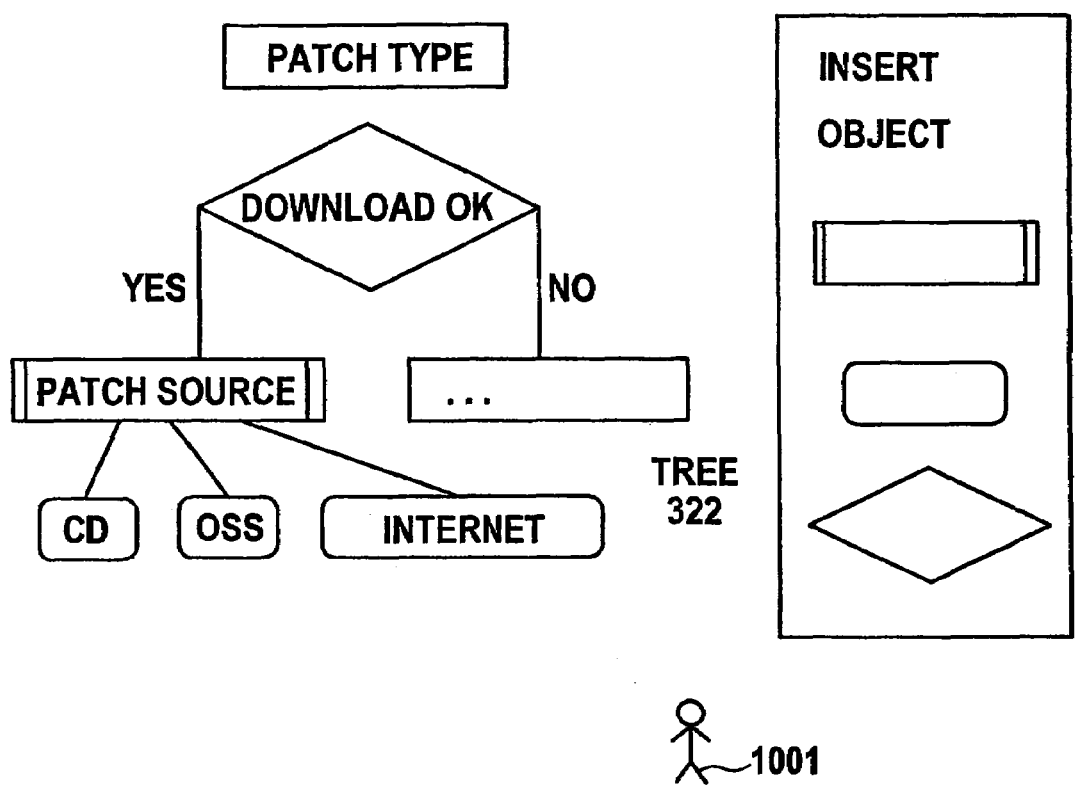
FIG. 4 illustrates an acquisition module in the auxiliary system with more detail.

FIG. 4 illustrates acquisition module 320 for the exemplary implementation. Acquisition module 320 also modifies knowledge representations R. Acquisition module 320 interacts with knowledge engineer 1001, as illustrated, through tree 322 on a graphical user interface. Acquisition module 320 uses tree 322 to represent the knowledge representations R as a semantic net. Engineer 1001 may use well-known edit or drag and drop techniques to manipulate the representations.

Knowledge engineers are, for example, (a) software developers who are familiar with main system 200, (b) technical writers who write documentations for customers, and (c) persons that have gathered experience as being a user (cf. 1000 in FIG. 1). Tree 322 assists engineer 1001 to modify knowledge representations. As in the example, tree 322 represents a rule relating to a patch type. The rule has a query step (Download OK?) and conditional steps. A patch is distinguished by its source between Compact Disk, OSS (online service system, cf. reference books), and Internet. Depending on the source, different advices can be defined. Also, user 1001 is invited to modify tree 322 by inserting icons from an icon tray ("insert objects").

Figure 5:
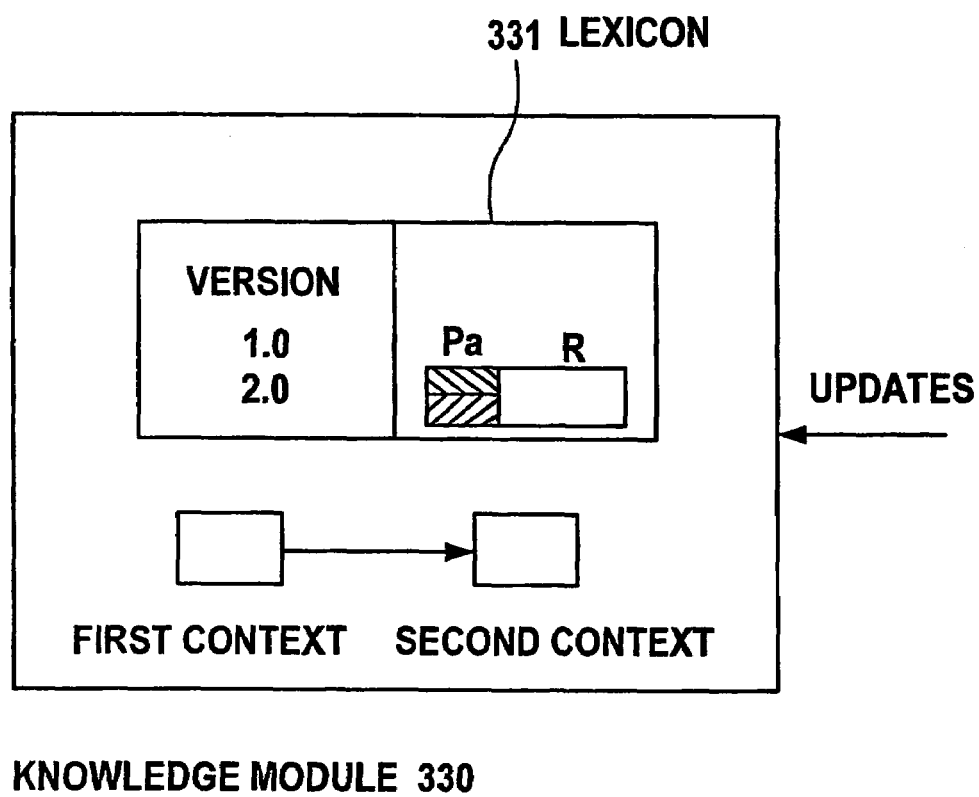
FIG. 5 illustrates a knowledge module in the auxiliary system with more detail.

FIG. 5 illustrates knowledge module 330 for the exemplary implementation. Knowledge module 330 stores knowledge representations R by classifying into context, for example, business transactions as part of the application A, executable programs as part of the application A, and hierarchy level within the application A.

Optionally, knowledge module 330 uses lexicon 331 to distinguish versions of main system 200 (e.g., versions "1.0" and "2.0"). Lexicon 331 defines parameters Pa (for a particular version) and knowledge representations R (for all versions). The figure illustrates the different parameters by different hatching. Distinguishing is very convenient if auxiliary system 300 serves 2 or more main systems 200 that have different version (i.e. release or language). For example, main systems 200 might differ in their table definitions due to different release dates. Distinguishing through parameters for equal representations helps to keep the number of knowledge representations at a convenient level. Useful is also to distinguish between different natural languages: For example, while a first main system communicates with its users in German; a second main system communicates with its users in English; both mains systems are supported by a common auxiliary system that provides dialog texts in English or German. Knowledge module 330 makes the knowledge representations R selectively available or non-available according to a selected context or version.

Knowledge module 330 distinguishes context with primary context and secondary context, wherein the secondary context is referenced from the first context. The first context can refer to the second context, the second context can refer to the first context, or both contexts can refer to each other. Knowledge module 330 selects knowledge representations R to be considered by inference module 340 according to the context of a current transaction by the application server 220. Selected context is selected by user 1000 or by a predefined rule. For example, the context is selected from: system and program performance, background processing, OCS and patches, data dictionary, printer problems, remote function calls and connectivity, R/3 reporting, and security and administration.

For example, the first context is defined by the application with a transaction "Patch Manager". Problem P and data D are "Patch not found". Knowledge representations R have hints to find a storage location for patches (e.g., a directory or a server). But processing does not result in a solution S. The problem remains unsolved. However, the link "Transport" refers from the first context to the second context. The second context leads to knowledge representations R to software installing procedures. Processing with these representations R leads to solutions S.

Knowledge module 330 is adapted to receive regular updates of the knowledge representations R (arrow symbol). The updates can originate, for example, from a service system (cf. FIG. 5) that acts as further auxiliary system. Knowledge module 330 stores knowledge representations R in database 210 with entries for specific problem P symptoms and corresponding solutions S.

Knowledge module 330 stores knowledge representations R that point to predefined solution identification rules in database 210 (or in module 330 itself). The solution identification rules are provided in a meta language. The meta-language is derived from ABAP/4.

The rules usually identify action, object, arguments and result location. An example for meta language is, for example, a 2-line rule for storing data. The first line reads as "CALL" (action), "FUNCTION" (object), "GET_FILE_PATH" (argument), and "FILE_PATH" (result location) to find a file directory (path) and to keep the file directory in a first variable ("FILE PATH"). The second line reads as "CHECK_EXIST" (action), "FILE" (object), "<FILE_PATH>/rfc.trc" (argument) and "EXIST" (result location) to check the existence of file "rfc.trc" in the directory and to write existence/absence result into a variable ("EXIST").

Providing R in meta-language in convenient for automatically processing. Markup languages (e.g., XML) are also useful. It is an advantage that R can also be provided partially or completely in natural languages (e.g., English) for "processing" by a human.

Knowledge module 330 generates a structured set of problem solving strategies, such as so-called "troubleshooting guides". These are strategies for consideration by a specialist or by the user.

Knowledge module 330 generates solution identification rules with computer instructions that the computer utilizes to automatically solve the problem. Preferably, knowledge module 330 distinguishes error classes (details below).

Sets of semantically related solution identification rules are grouped together, such as rules to find the problem "inconsistency in a table", and rules to find the corresponding code to "automatically re-arrange the table" (i.e. utilizing the solution). Tables in the database 210 are not only used to organize data for application A, but also convenient for knowledge module 330 to stores knowledge representations R. In that case, the tables are provided prior to activating auxiliary system 300.

The following is an example for using knowledge representations R, context and check lexicon: The knowledge representations form a set of R1, R2, R3, . . . , R16, . . . , R99 (consecutively numbered). Each R is defined by meta-language, such as "CHECK PRINTER CONNECTION" for R16.

Context are subsets of representations for that relate to problem classes, such as context PRINTER with R5, R6 and R16. The check lexicon lists details for knowledge representations depending on versions of main system 200 (optionally versions of application A). R16 for version 3.0 testing an IP connection by a standard "PING PRT" command to the printer; for version 3.1 calling a dedicated test function (in auxiliary system 300); for version 4.0 instructing the printer to print a test page.

When processing problem data D such as "printing not possible" for main system 300 of version 3.0, auxiliary system 200 extract the context set PRINTER from all R, checks the lexicon for applicable details and applies each R in combination with the details (e.g., R16 PING PRT). If a solution is still missing, the context changes, for example, to GENERAL with R1 "CHECK POWER SUPPLY". Applying R1—this time without distinguishing versions—leads to a success. The printer was not connected to the mains power. The solution S is identified as a message to the user that is forwarded to the user (in the further context of the English language, through the front-end server): "Please connect your printer to the 230 volts power supply."

FIG. 6 illustrates inference module 340 in auxiliary system 300 with more detail. Inference module 340 identifies the solutions S from sets of predefined advices (preferably, advices of application A) by a solution identifier.

Inference module 340 identifies the solutions by applying the knowledge representations R (to data D) in a predefined order that is, for example, a sequential order (e.g., R1, R2, R3), a hierarchical order (e.g., R1, R21, R21, R31, R32), a dynamically adaptive order in that the order might chance by conditional jumps or the like (e.g., IF THEN).

Inference module 340 communicates questions to user 1000 (cf. Q1, Q2, Q3 reservoir). Preferably, the questions are standard questions. Inference module 340 consecutively numbers the questions. Inference module 340 composes the questions from predefined passages that are provided by application server 220. Inference module 340 analyzes the responses that user 1000 enters in natural language (cf. language analyzer).

Figure 7:
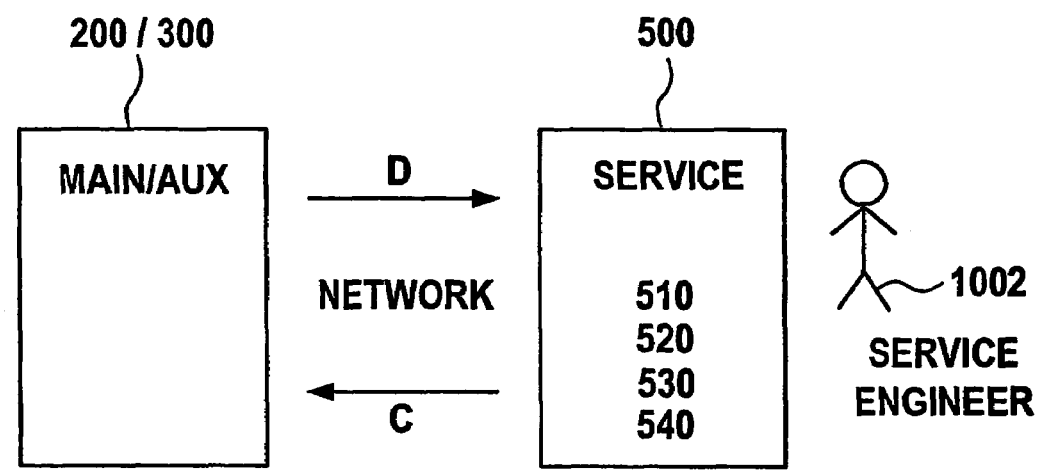
FIG. 7 illustrates a first distributed system landscape with the main and auxiliary systems coupled to a service system.

So far the exemplary implementation has been described with main system 200 and auxiliary system 300 that communicate by basis functions and that are implemented by a single R/3 system. Distributing modules of auxiliary system 300 to a client/server system configuration is convenient. The invention is however not limited to that. Further implementations benefit from the following:

(a) Main and auxiliary systems can be distributed to different computer systems (e.g., different R/3 systems; cf. FIG. 7).

(b) A further auxiliary system (here called service system) can provide enhanced problem evaluation capacities (cf. FIG. 7).

Figure 8:
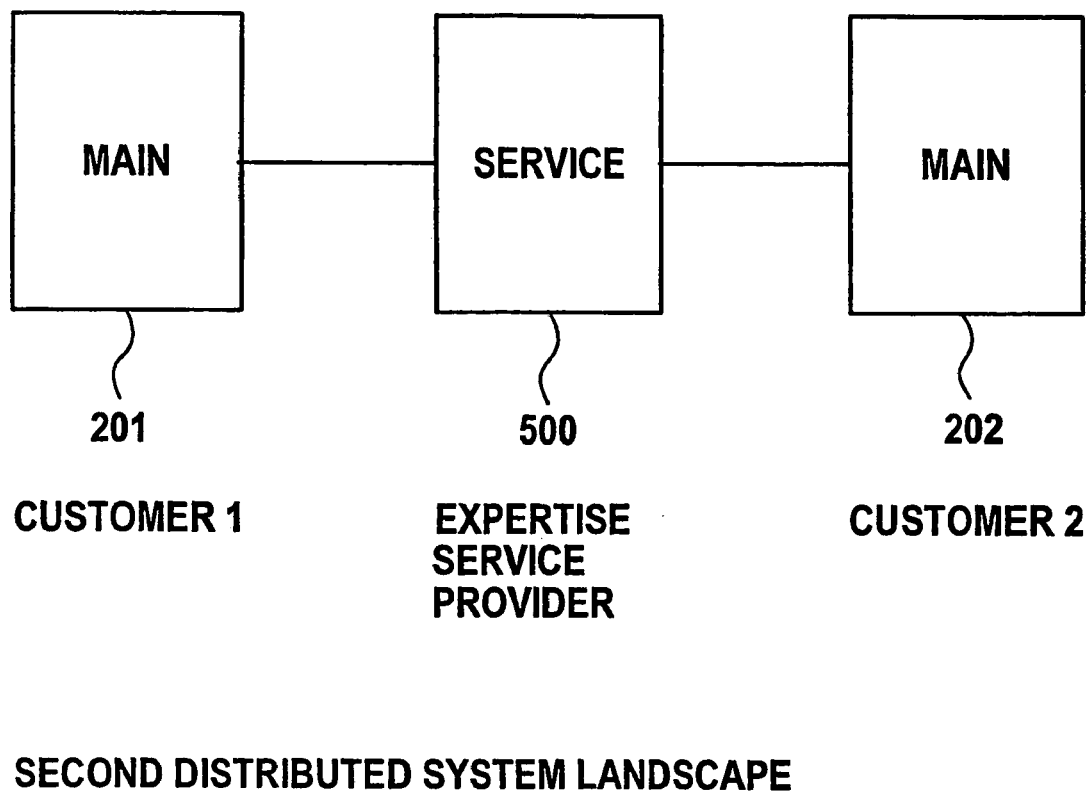
FIG. 8 illustrates a second distributed system landscape with 2 main systems coupled to a service system.

(c) One auxiliary system can serve 2 or more main systems (cf. FIG. 8).

d) Applicable knowledge representations can be selected for a particular version of the main system, for example, by maintaining a check lexicon.
e) A first auxiliary system starts to evaluate the problem by first knowledge representations and forwards evaluation results to a second auxiliary system. The second auxiliary system then returns a second (enhanced) knowledge representation to enable the first auxiliary system to finish the evaluation.

For convenience of explanation, the following uses the term "system 200/300" collectively for the combination of main system 200 with auxiliary system 300 for main system 200 alone. In other words, auxiliary system 300 is not longer required in any case.

FIG. 7 illustrates a first distributed system landscape with system 200/300 coupled to a service system 500 via a network. Service system 500 has auxiliary components with functions that are substantially similar to that of auxiliary system 300: service module 510, acquisition module 520, knowledge module 530, inference module 540 as well as modules for front-end communication. The foregoing description is applicable for these modules as well.

Preferably, system 500 operates independently from any main system and does not execute an ERP application. Optionally but not mandatory, service system 500 has a client/server configuration, such as system 500 in an exemplary implementation being an R/3 type system. In comparison to system 200, service system 500 uses knowledge representations R that are enhanced in terms of volume, actuality, and complexity. If required, system 500 also solves problems in auxiliary system 300. In short, system 500 has at least the above-mentioned functions of auxiliary system 300 and serves as the expert system for system 200/300.

Service system 500 is conveniently installed at a manufacturer's site (of system 200/300) and communicates with system 200/300 by receiving problem data (D) from system 200/300 and sending control instructions (C) to system 200/300.

Service system 500 is—optionally—operated by service engineer 1002 who helps to solve problems in system 200/300. Dynamic enhancement is possible: control instructions C are conveniently also used to regularly update knowledge module 330 with actual knowledge representations (R, cf. FIG. 5 updates).

If system 200/300 is implemented with auxiliary system 300, then auxiliary system 300 acts as a first expert system and service system 500 act as a second expert system. Depending on the severity of the problem (in system 200), problems are evaluated as follows:

(1) Auxiliary system 200 solves the problem (i.e. solutions S are identified by system 300).
(2) Auxiliary system 200 does not solve the problem but forwards a package with problem P data in combination with preliminary solutions S (i.e., P/S data, based on knowledge representations (R) in system 200) to service system 500. Service system 500 then solves the problem.
(3) Auxiliary system 200 does not solve the problem but forwards the P/S data package to service system 500. System 500 uses the P/S data to return further knowledge representations. This enables system 200 to evaluate and solve the problem.
(4) Service system 500 does not solve the problem automatically and needs to interact with service engineer 1002 (further analysis by a human technician).

FIG. 8 illustrates a second distributed system landscape with main systems 201 and 202 coupled to service system 500. The approach of FIG. 7 has been expanded by adding a further main system. Optionally, service system 500 is operated by a service engineer (cf. 1002).

In the exemplary implementation, main system 201 is physically implemented on a first computer; main system 202 (as system 201 also in client/server configuration) is implemented on a second computer, service system 500 is implemented on a third computer. Auxiliary systems are optionally added to main systems 201 and 202.

Main system 201 is adapted to be operated by a first customer (e.g., a first company), service system 500 is implemented by expertise service provider ESP and main system 202 is adapted to be operated by a second customer (e.g., a second company). For example, ESP is the manufacturer of systems 201/500/202 or is a consulting agency. Preferably, main systems 201 and 201 are systems of the same type (e.g., R/3), but have different release versions (i.e. 201 older than 202, or vice versa).

Different release versions are distinguished by context groups. (cf. FIG. 5). Such an arrangement is convenient also for main systems that communicate with their users in different natural languages. While problem identification is technically the same in systems 201/202, messages to users (e.g., notes, dialogs) can be in different natural languages.

Some or all of the computers are located at physically different locations. Expertise of service system 500 becomes available around the globe. Service system 500 could simultaneously serve main systems 201/202 in different continents around the clock.

Having service system 500 physically separated from main systems 201/200 has further beneficial effects: For example, expertise (i.e. knowledge representations R) is shielded from access by main system 201/202; and sensitive data on main systems 201/202 is shielded from access by service system 500.

Further distributions of main, auxiliary and service systems are possible. For example, a plurality of main systems can be equipped with auxiliary systems that solve problems for their corresponding main system or forward problem data to service systems.

Figure 9:
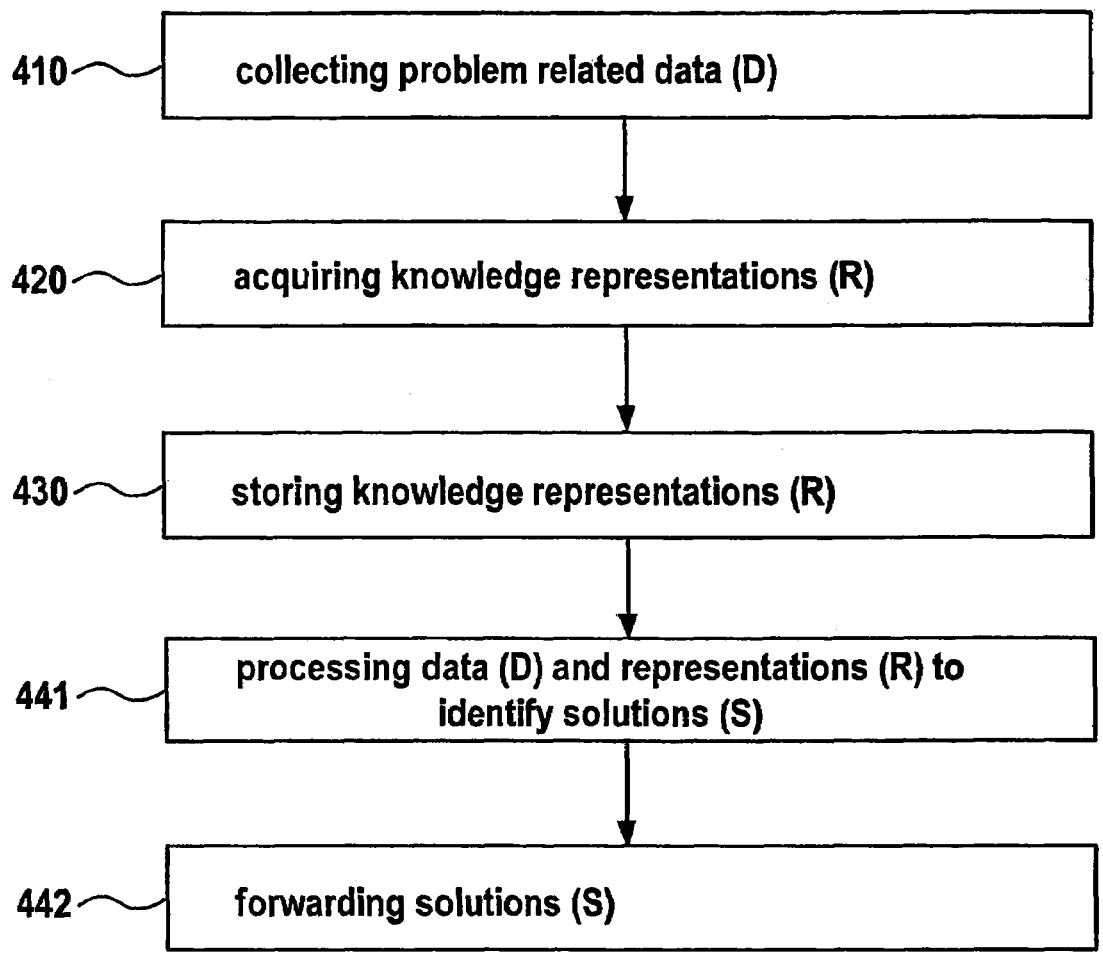
FIG. 9 illustrates a simplified flowchart diagram of a method for operating the main, auxiliary and service systems.

FIG. 9 illustrates a simplified flowchart diagram of method 400 for operating computer system 200/300. Method 400 is also applicable if auxiliary system 300 is replaced by service system 500.

As stated above, system 200/300 has main system 200 executing application A in cooperation with human user 1000 and has auxiliary system 300 evaluating problems P in main system 200. According to method 400, auxiliary system 300 performs the following steps: collecting 410 problem related data D from main system 200, acquiring 420 knowledge representations R, storing 430 knowledge representations R, processing 441 problem related data D with knowledge representations R to identify solutions S, and forwarding 442 the solutions S through service module 310 to main system 200. Method steps are also illustrated in FIG. 1 by arrows COLLECT, ACQUIRE, STORE, PROCESS, FORWARD.

In the exemplary implementation, step collecting 410 is performed by service module 310; step acquiring 420 is performed by acquisition module 320; step storing 430 is performed by knowledge module 330; and steps processing 441 and forwarding 442 are executed by inference module 340. Modules 310-340 have been explained in connection with FIGS. 1-6.

In the exemplary implementation, steps collecting 410, acquiring 420, storing 430, processing 441 and forwarding 442 are performed for main system 200 that has a client/server configuration with database 210, application server 220, and front-end server 230. Steps collecting 410, acquiring 420, storing 430, processing 441 and forwarding 442 are performed in modules 310, 320, 330, 340 (of auxiliary system 300) that are arranged in parallel to main system 200.

Steps acquiring 420 knowledge representations R and forwarding 442 solutions S comprise to operate a user-interface in front-end server 230 of main system 200. Steps collecting 410, acquiring 420, storing 430, processing 441 and forwarding 442 are performed by basis service functions of main system 200.

The following is optional for step collecting 410: Service module 310 cooperates with main system 200. Service module 310 cooperates with database 210 to test the existence of objects: problem-related data D informs about existence and non-existence of the objects. Service module 310 cooperates with database 210 to obtain the content of a table entry as problem related data D. Service module 310 records events in the operating system of main system 200 by writing to database 210. Service module 310 records problem related data D obtained from data consistency check operations of main system 300. Service module 310 instructs front-end server 230 to provide dialogs with user 1000. Service module 310 provides remote function call RFC connections with service system 500 (operating like a remote auxiliary system). Service module 310 monitors application server 220 and database 210 according to instructions from inference module 340.

The following is optional for step acquiring 420: Acquisition module 320 modifies the knowledge representations R. Acquisition module 320 interacts with a knowledge engineer. Acquisition module 320 interacts with the knowledge engineer through tree 322 on a graphical user interface (cf. FIG. 4). Acquisition module 320 uses tree 322 to represent knowledge representations R as a semantic net.

The following is optional for step storing 430: Knowledge module 330 classifies the knowledge representations R into context groups. Knowledge module 330 organizes the context groups by lexicon 331 (cf. FIG. 5). Knowledge module 330 defines the context by a version of main system 200 and defines lexicon 331 by knowledge representations for the versions. Knowledge module 330 makes the knowledge representations R selectively available or non-available according to a selected context for subsequent step processing 441. Knowledge module 330 distinguishes context between primary context and secondary context. Knowledge module 330 stores knowledge representations R in database 210 with entries for specific problem P symptoms and corresponding solutions S. Knowledge module 330 stores knowledge representations R in database 210 with entries for predefined solutions identification rules. Knowledge module 330 stores knowledge representations R in a plurality of tables in database 210.

The following is optional for step processing 441: Inference module 340 performs an action such as to: identify the solutions S form a set of predefined advices of the application A, identify the solutions S by applying knowledge representations R in a sequential order, identify the solutions S by applying knowledge representations R in a hierarchical order, identify the solutions S by applying knowledge representations R in a dynamically adaptive order, communicate questions to user 1000 by composing the questions from predefined passages provided by application A, analyse responses that user 1000 enters in natural language.

Optionally, systems 200/300 cooperate with service system 500 (cf. FIG. 7): While executing any of steps collecting 410, acquiring 420, storing 430, processing 441 and forwarding 442, auxiliary system 300 conditionally forwards problem P data in combination with solutions S to service system 500. In the alternative, auxiliary system 300 forwards problem P data and solutions S for further analysis by a human technician. Auxiliary system 300 forwards problem P data and solutions S in a format that allows analysis by an expert system, for example by service system 500.

Figure 10:
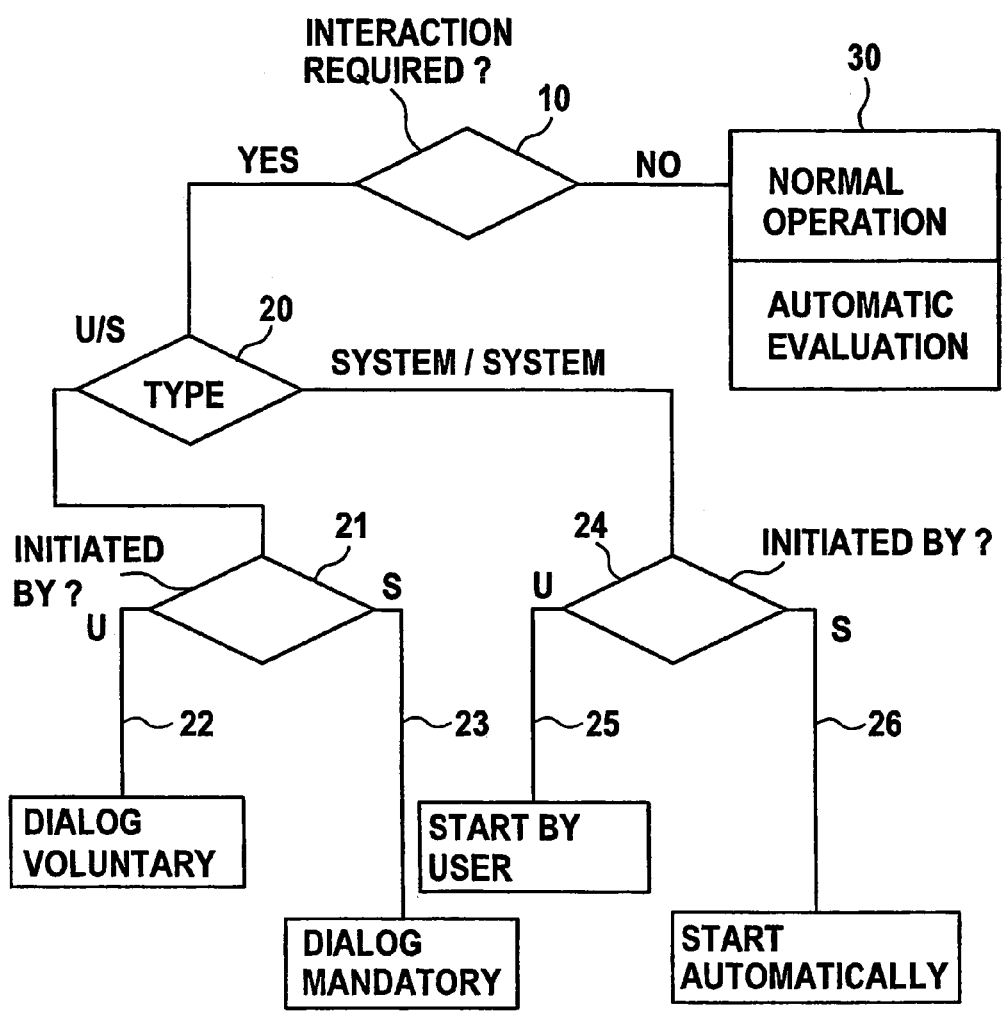
FIG. 10 illustrates a simplified scenario that considers interaction, and thereby distinguishes automatically problem evaluating and semi-automatically problem evaluating.

In short, executing method 400 depends on a variety of circumstances. FIGS. 9-10 give exemplary overviews for scenarios that develop dynamically and that adapt the particular circumstances.

Figure 11:
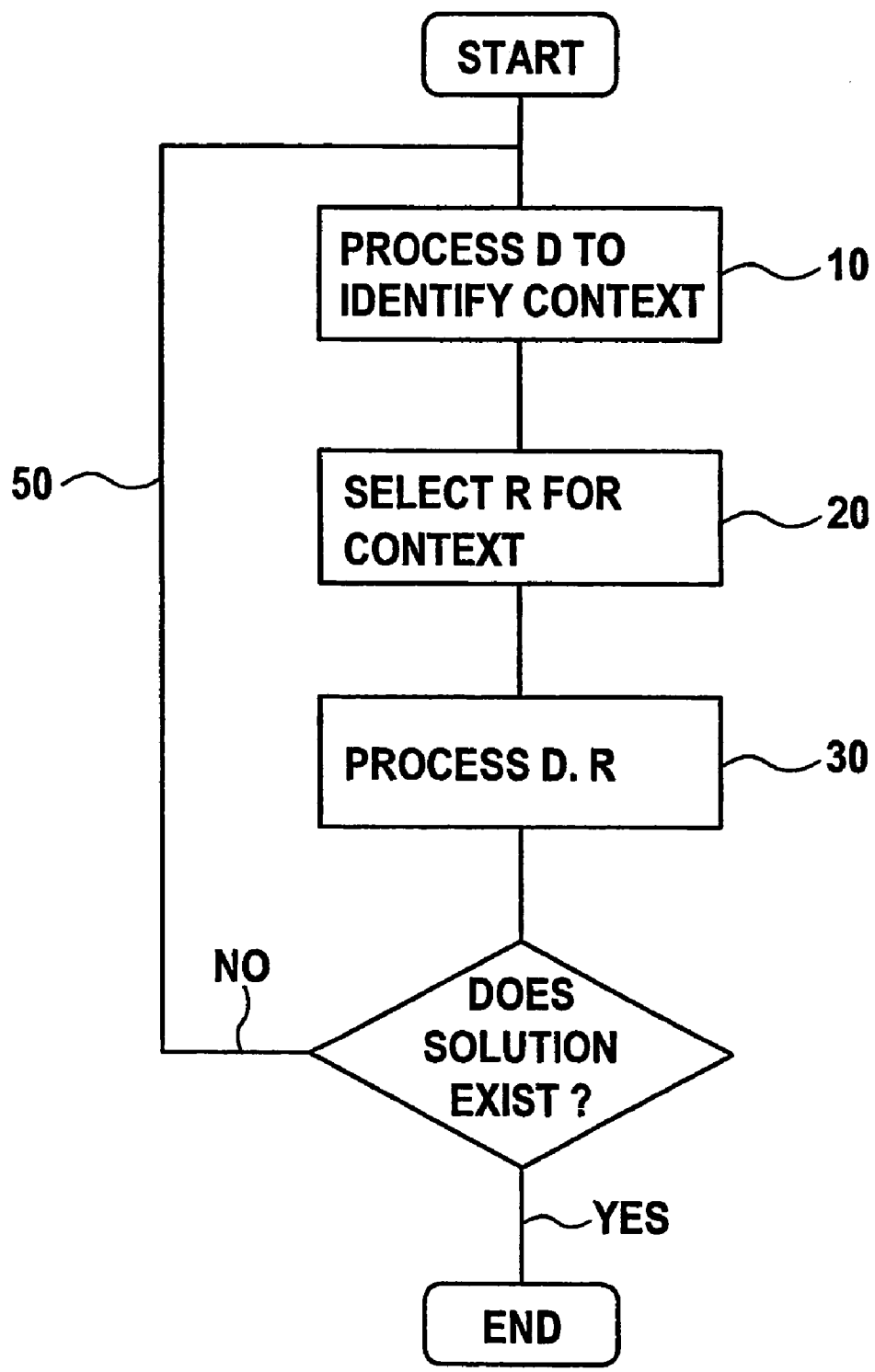
FIG. 11 illustrates a simplified scenario that considers primary and secondary context.
Figure 12:
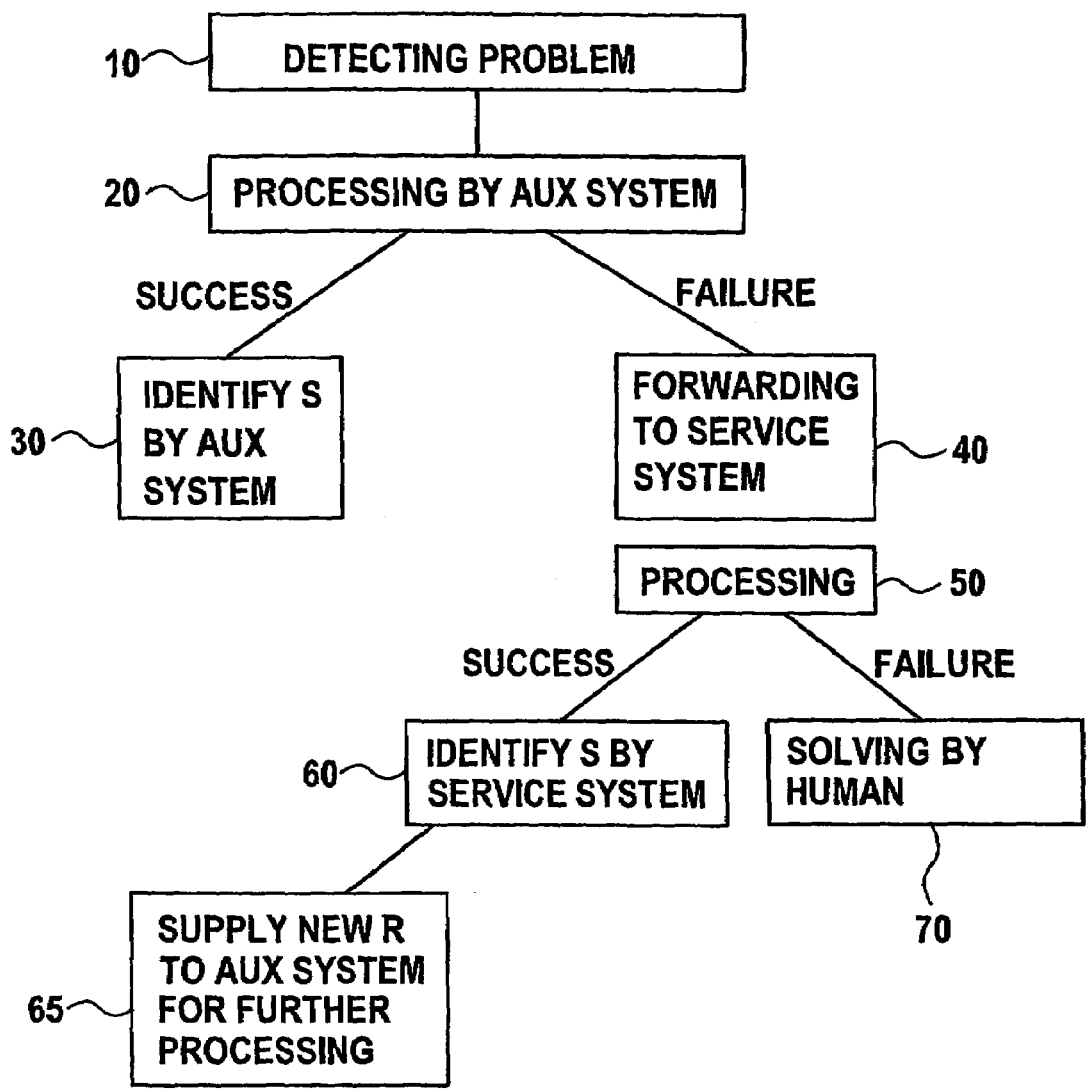
FIG. 12 illustrates a simplified scenario that considers the distribution of problem collecting and solution processing in the system landscapes.

For illustration, exemplary scenarios refer to interaction (FIG. 10), context (FIG. 11) and distribution of problem collecting and solution processing (FIG. 12). The following description denotes queries by question marks.

FIG. 10 illustrates a simplified scenario that considers interaction, and thereby distinguishes to automatically evaluate the problem and to semi-automatically evaluate the problem. Interaction occurs among systems 200, 300 and 500 and human user 1000.

(10) Is interaction between main system 200 and auxiliary system 300 (or service system 500) required? The yes/no answer could depend on the performance during collecting or processing steps.

(30) If no, system 200 continues to automatically evaluate the problem or continues with normal operation, usually in the absence of any problems.

(20) If yes (interaction required): What is the interaction type: user/system (U/S) interaction (e.g., 200, 300 or 500 with 1000) or system/system (S/S) interaction (e.g., 200 with 300, 200 with 500, 300 with 500)?

(21) If user/system interaction, is the interaction initiated by a user or initiated by a system?

(22) If initiated by a user, for example, user 1000 detects a problem and starts a voluntary dialog with auxiliary system 300 or with system 500 at any time. A good opportunity for starting is to press a specialized button ("PROBLEM ANALYSIS") when viewing an error message.

(23) If initiated by a system, for example, system 300 collects problem related data (D) by providing a mandatory dialog (system 300 with user 1000).

(24) If system/system interaction, is the interaction initiated by a user or initiated by a system?

(25) If initiated by a user, for example, user 1000 starts the operation of 200/300 (cf. description method 400) or the operation of 200/500.

(26) If initiated by a system, for example, system 200/500 starts its operation automatically.

The query order can be modified: the query for U/S or S/S interaction (10) could follow the initializing queries. U/S and S/S interactions and initializations can be related to each other.

FIG. 11 illustrates a simplified scenario that considers primary and secondary context.

(10) Processing problem data D to identify context (i.e. first context) and versions, thereby using lexicon 331 (cf. FIG. 5).

(20) Selecting knowledge representations R for that context (or version).

(30) Processing problem data D and knowledge representations R to find solutions S.

(40) Querying for the existence of a solution and finishing if solution exists.

(50) Repeating processing to identify further context (i.e. second or higher context, or other versions) and querying until a solution S is identified until all contexts have been considered.

FIG. 12 illustrates a simplified scenario that considers the distribution of problem collecting and solution processing for the various systems. The scenario is useful for distributed systems with main system 200, auxiliary system 300, and service system 500 (cf. FIGS. 7-8). Depending on the availability of knowledge representations R (in auxiliary system 200 and in service system 500) that match to problem data D, the problem is automatically evaluated and solution S is identified by auxiliary system 200 or service system 500, or the problem is manually evaluated and the solution S is found by a human (e.g., user or technician). Modifications to the scenario (semi-automatically evaluating and solving) are also possible.

The scenario substantially has the following phases:

(10) Detecting the problem in main system 200.

(20) Processing data D with R by auxiliary system 300 to identify a solution S (cf. method 400).

(30) If processing successes to a solution S, solving the problem by auxiliary system 300.

(40) If processing fails (no solution), forwarding data D to service system 500 (optionally enhancing D as described above).

(50) Processing data D with R by service system 500 to identify a solution S (applying method 400 analogously).

(60) If processing successes to a solution S, utilizing S (i.e. solve the problem) by service system 500 (or by auxiliary system 300 that is instructed by service system 500).

(65) Optionally, supplying new R to auxiliary system (for finding a final solution by the auxiliary system).

(70) If processing fails, evaluating the problem and finding S by a human.

Once a solution S has been identified, it can be applied to actually solve the problem in a similar scenario.

It is within the scope of the invention to superimpose such and other scenarios, for example, to have a scenario with interaction queries, with context consideration and with distribution.

Figure 13:
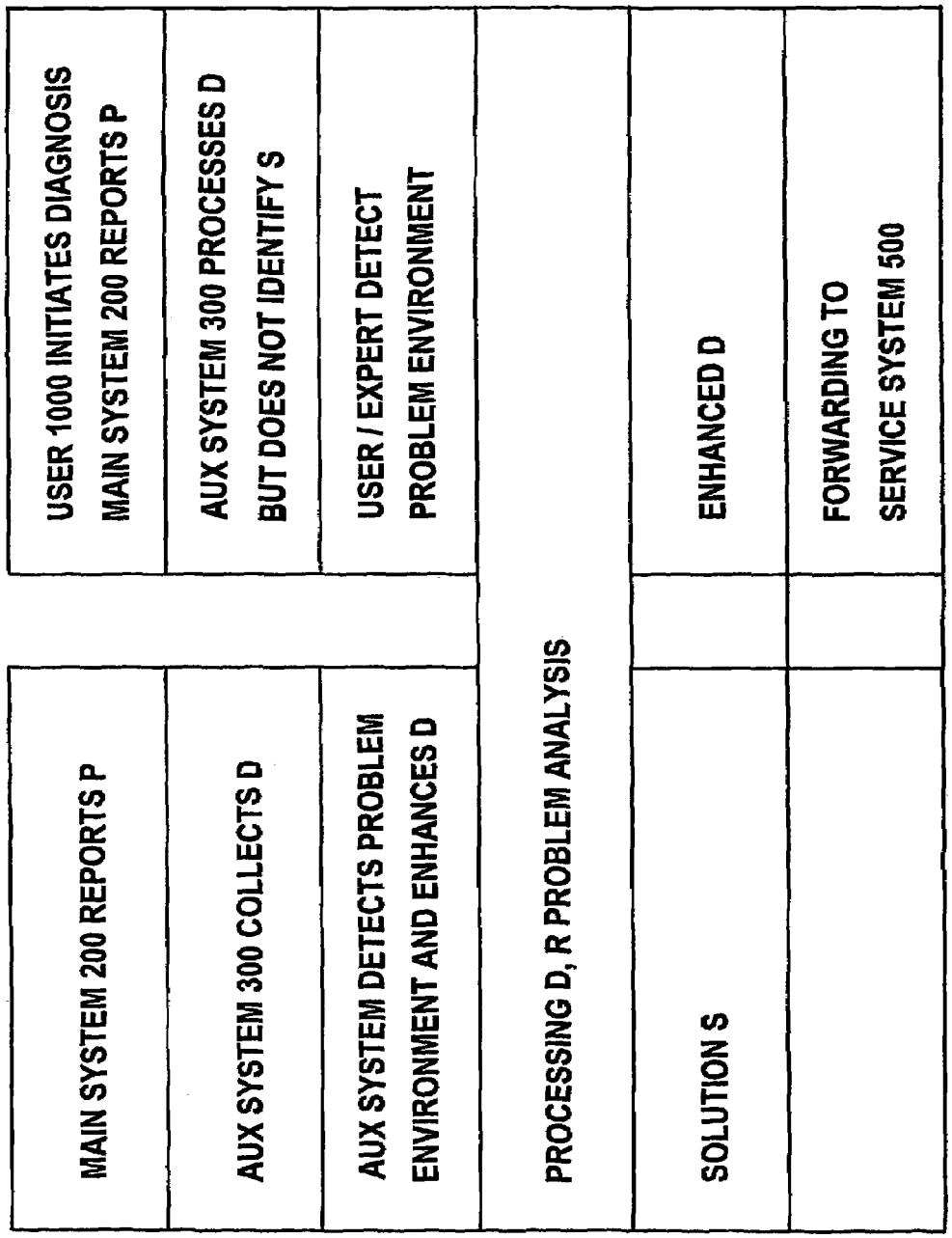
FIG. 13 illustrates further simplified scenarios.

FIG. 13 illustrates simplified exemplary scenarios for solving problems in main system 200. Phases are given in top-down direction. Phases on the left side belong to the first exemplary scenario with automatically solving by the auxiliary system (illustrated on the left); phases on the right side belong to semi-automatically solving by forwarding enhanced data to service system 500. Processing phases are similar and therefore illustrated for both sides.

As illustrated for the first scenario, main system 200 reports a problem (i.e. problem P); auxiliary system 300 collects the data (cf. step 410) to analyze the problem environment (i.e., operating system; versions; tables); system 300 enhances the data by the problem environment; system 300 processes data (D) and knowledge representations (R) (problem analysis) to identify the solution (S). (cf. FIG. 9, (10)(30))

As illustrated for the second scenario, user 1000 initiates problem diagnosis, for example, main system 200 reports a problem (i.e. P). Auxiliary system 300 processes data (D) and knowledge representations (R), but does not identify a solution (e.g., R insufficient, D unknown). The user (or a computer specialist) manually collects further problem related data (e.g., about operating system); starts processing again to enhance the problem data (D) by environment data; re-processing by system 300 does however not result in a solution (S). Therefore, the user decides to forward the enhanced problem data to service system 300. Service system then starts to re-evaluate the problem, usually with a more comprehensive set of knowledge representations (R) and solutions (S). (cf. FIG. 9, (10), (20), (21), (22), (10), (20), (24), (26))

FIGS. 9-13 concentrate on examples. Further scenarios can be implemented, using other yes/no queries or case distinctions. Examples are explained in the following.

(a) Is there a need to manually input problem data D? For some cases, especially for rare problems, preparing comprehensive knowledge representations R is not possible (or too expensive). The user can enter data via dialogs or other user interface elements.

(b) Does knowledge module 330 has a sufficient number of knowledge representations R? The number is usually sufficient if processing (step 441) results in solutions S. The number is usually insufficient if processing does not result in solutions S. In that case, activating acquisition module 320 and knowledge module 330 is possible to add or modify knowledge representations R.

(c) Does knowledge module 330 need to obtain further knowledge representations R? This query is related to the previous one. Representations (R) can be obtained from distributed systems. For example, system 300 can obtain R from system 500. This is convenient, for example, if system 300 operates at a customer site (occasional update) and system 500 operates at the site of a system manufacturer (daily update).

(d) Are there updates available for modules 310, 320, 330, 340, for knowledge representations (R) or the like? Again, updates can be loaded from system 500 to system 300.

(e) Is human support service available in a daylight time-zone to solve a problem in a night-light time-zone? If service systems 500 and specialists (i.e. service engineer 1002) are required, then system 200/300 could send a request to system 500 in a daylight time-zone. A 24-hour-service can be established with specialists working during daylight hours.

(f) Is there an emergency in solving the problem or is there allowable waiting time? Are there 2 or more problems with different urgency or priority levels? Prioritizing adds value; solutions to high-profile problems could be searched in parallel by system 300 and by system 500.

(g) Did the problem cause immediate symptoms? Some problems show symptoms only if they have become severe (e.g., a table with data overflow). Auxiliary system 300 can evaluate the performance of the main system to find problems before they appear to the user. Conveniently, systems 300 or 500 operate in the background to identify hidden problems and operate in the foreground (i.e. with interaction) to solve visible problems.

(h) Having the solution identified, is there a predefined instructions sequence assigned to that solutions to automatically solve the problem? Automatic (or semi-automatic) problem solving according to predefined instructions could follow processing.

(i) It the problem classified in a particular error class? Problems and their corresponding solutions can be classified in great variety. Exemplary classes are:

Class "information", auxiliary system 300 informs user 1000 about application details that are usually not critically to main system 200;

Class "operation error", user 1000 does not properly operate system 200 (e.g., by accident), system 200 does not behave as specified, such problems can be solved, for example, by informing user 1000 through messages.

Class "performance", system 200 exhibits relatively long response times; problems like this are often related to hardware failure or to overflow of tables.

Class "wrong result", system 200 operates stable, but results are calculated incorrectly or inconsistently, exemplary solutions are consistency correcting or debugging.

Class "system error", system 200 detects an invalid processing step; an exemplary solution is the identification of the system module that causes the error (tracking function).

Class "cancellation", system 200 partly or completely stops to operate, an exemplary solution is to reproduce the error.

(j) Can evaluating (i.e. method 400) be repeated with modified parameters (i.e. iteration with different D, R, or S)?

Without departing from the scope of the invention, persons of skill in the art may add further functionality, such as for context retrieval, long-text messages, heuristics, artificial intelligence, or exception handling.

Figure 14:
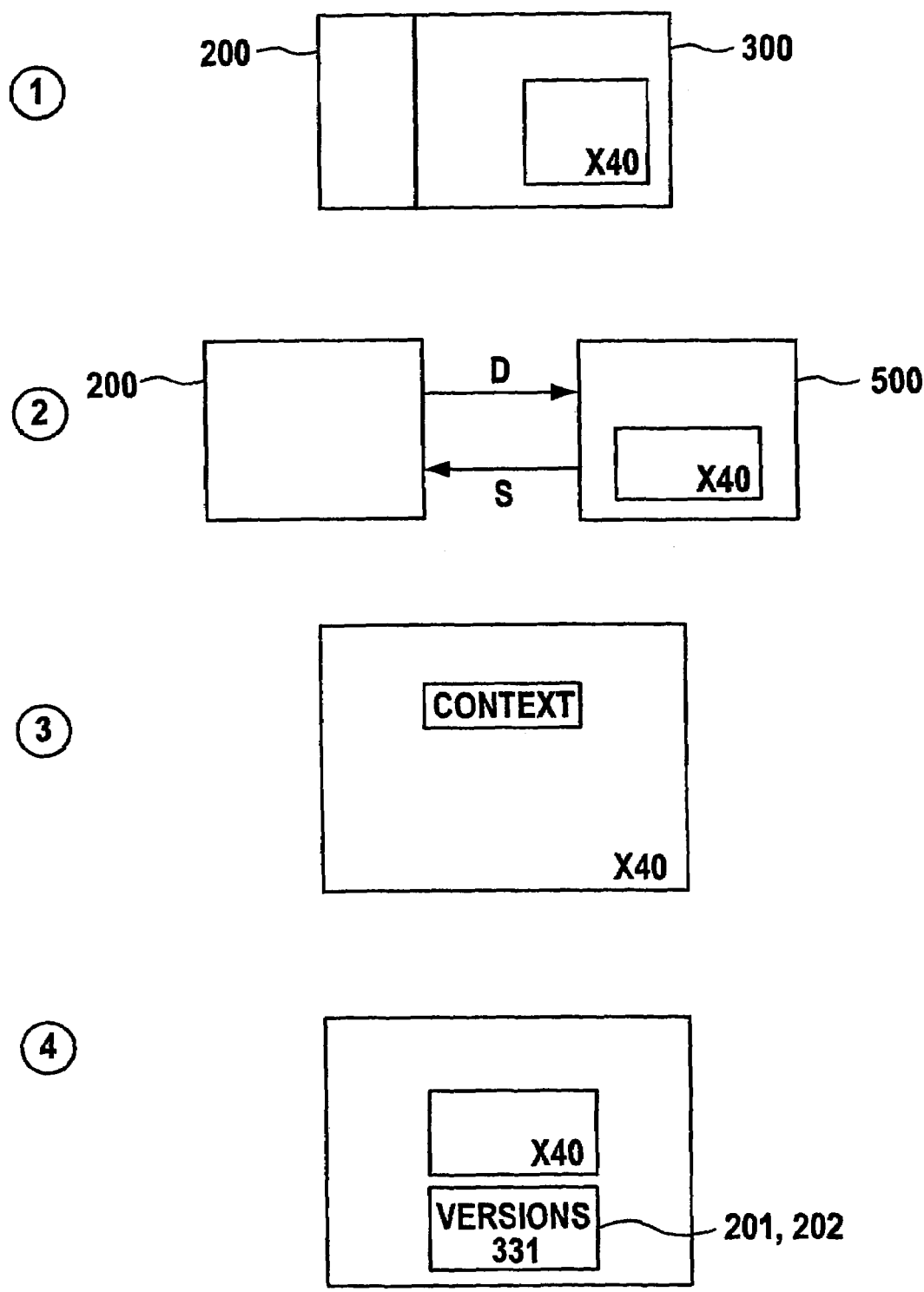
FIG. 14 summarizes various aspects of the present invention by concentrating on an inference module.

FIG. 14 summarizes various aspects of the present invention by concentrating on inference module 340/540 (collectively x40). As explained above, inference module x40 processes problem related data D with knowledge representations R to identify solutions S.

Modules that make inference module x40 an integral part of an expert system (i.e. provide expertise functionality) have been explained above: modules for obtaining D and R (e.g., collect, acquire, store), to use S and—optionally—to interact with a human user.

Briefly, inference module x40 has expertise functionality for evaluating problems P in main computer system 200 that executes an application A. Inference module x40 is adapted to process problem related data D with knowledge representations R to identify solutions S. For example, inference module x40 has one of the following configurations:

In a first configuration, inference module x40 is part of auxiliary computer system 300 that uses basis functions of main computer system 200. Main computer system 200 and auxiliary computer system 300 are client/server systems.

In a second configuration, inference module x40 is part of service system 500 that receives problem related data D from main computer system 200 over a network and that returns solutions S to main computer system 200. In a first case, service system 500 returns solutions S that solve the problem directly. In a second case, service system 500 return solutions S that solve the problem indirectly by being further knowledge representations for a further inference module (e.g., module 340).

In a third configuration, inference module x40 distinguishes problem related data D and—optionally—knowledge representations R in context classes.

In a fourth configuration, inference module x40 is part of service system 500 that receives problem related data D from first and second main systems 201, 202 of different versions over a network. Inference module x40 applies knowledge representations R for both main systems 201, 202 and distinguishes version differences of the main systems by looking up in check lexicon 331.

The present invention can also summarized as follows:

Preferably, selected context is selected by user 1000. Preferably, selected context is selected by a predefined rule. Preferably, knowledge module 330 applies a predefined rule to select knowledge representations R to be considered by inference module 340 according to the context of a current transaction in application server 220. Preferably, context is selected from the group of: system and program performance, background processing, OCS and patches, data dictionary, printer problems, remote function calls and connectivity, R/3 reporting, and security and administration. Preferably, main system 200 has a client/server configuration with database 210, application server 220 and front-end server 230. Preferably, computer system 200/300 is a system of an R/3 type.

Preferably, main system 200 executes application A as an enterprise resource planning ERP application. Preferably, the EPR application is selected from the group of: supply chain management, customer relationship management, financials, human resources, enterprise portals, exchanges, technology, product lifecycle management, supplier relationship management, business intelligence, business intelligence, mobile business, hosted solutions, small and midsize business, industry solutions. Preferably, the ERP application is defined by instructions that have common keywords, common syntax and common semantic with environments selected from the group of: ABAB/4, Java 2 Platform Enterprise Edition J2EE, and .NET framework. Preferably, auxiliary system 300 uses client/server configuration 210, 220, 230 of main system 200; the modules of auxiliary system 300 are distributed such that service module 310, acquisition module 320, knowledge module 330, and inference module 340 are arranged in parallel to application server 220 and to database 210. Preferably, front-end server 230 operates as user-interface for the main system 200 and for auxiliary system 300. Preferably, computer system 200/300 uses Internet communication between application server 220 and front-end server 230.

Preferably, service module 310 makes basis service functions of main system 200 available for auxiliary system 300. Preferably, the basis service functions are selected from the group of ABAP/4 workbench, administration, authorizations, batch input, data dictionary, dialog control, framework, graphical user interface, application program interface, and job. Preferably, service module 310 cooperates with main system 200 to obtain problem related data D for auxiliary system 300. Preferably, service module 310 cooperates with database 210 to test the existence of objects, wherein problem related data D comprises information about existence and non-existence of the objects. Preferably, service module 310 cooperates with database 210 to obtain the content of a table entry as problem related data D. Preferably, service module 310 records events in the operating system of main system 200 by writing to database 210. Preferably, service module 310 records problem related data D obtained from data consistency check operations of main system 200. Preferably, service module 310 instructs front-end server 230 to provide dialogs with user 1000.

Preferably, service module 310 provides remote function call RFC connections with service system 500. Preferably, service module 310 monitors application server 220 and database 210 according to instructions from inference module 340.

Preferably, acquisition module 320 also modifies knowledge representations R. Preferably, acquisition module 320 interacts with knowledge engineer 1001. Preferably, acquisition module 320 interacts with knowledge engineer 1000 through tree 322 on a graphical user interface. Preferably, acquisition module 320 uses tree 322 to represent knowledge representations R as a semantic net.

Preferably, knowledge module 330 is adapted to receive regular updates of the knowledge representations R from service system 500. Preferably, knowledge module 330 stores the knowledge representations R in database 210 with entries for specific problem P symptoms and corresponding solutions S. Preferably, knowledge module 330 stores knowledge representations R in the database 210 with entries for predefined solution identification rules. Preferably, the solution identification rules are provided in a meta language. Preferably, the meta-language is derived from ABAP/4.

Preferably, knowledge module 330 generates a structured set of problem solving strategies. Preferably, knowledge module 330 generates solution identification rules with computer instructions to automatically solve the problem. Preferably, computer system 200/300 is adapted to use the solution identification rules for automatically solving the problem. Preferably, sets of semantically related solution identification rules are grouped together. Preferably, knowledge module 330 stores knowledge representations R in a plurality of tables in database 210. Preferably, the tables are provided prior to activating auxiliary system 300.

Preferably, inference module 340 identifies the solutions S from sets of predefined advices. Preferably, inference module 340 identifies the solutions S from sets of predefined advices that are advices of the application A. Preferably, inference module 340 identifies the solutions by applying the knowledge representations R. Preferably, inference module 340 applies the knowledge representations R in a predefined order. Preferably, the predefined order is a sequential order. Preferably, the predefined order is a hierarchical order. Preferably, the predefined order is a dynamically adaptive order. Preferably, inference module 340 communicates questions to user 1000 via front-end server 230. Preferably, inference module 340 communicates questions that are standard questions. Preferably, inference module 340 consecutively numbers the questions. Preferably, inference module 340 composes the questions from predefined passages that are provided by the application server 220. Preferably, inference module 340 analyzes responses that the user enters in natural language. Preferably, auxiliary system 300 conditionally forwards problem P data to service system 500.

Preferably, auxiliary system 300 forwards the problem P data to service system 500 with preliminary analysis data based on processing with knowledge representations R in auxiliary system 200. Preferably, auxiliary system 300 forwards problem P data for further analysis by a human technician.

Preferably, auxiliary system 300 forwards problem data P and preliminary solutions S to service system 500 in a format that allows evaluation in the service system 500. Preferably, main system 201 is physically implemented by a first computer, service system 500 is implemented by a second computer and further main system 202 is implemented by a third computer. Preferably, main system 201 is adapted to be operated by a first customer, service system 500 is implemented by an expertise service provider ESP, and the at least one further main system 201 is adapted to be operated by a second customer.

Preferably, main system 200 and the further main system 201 are systems of the same type, but have different release versions. Preferably, some of the computers are located at physically different locations. Preferably, computer system 200/300 has a further module to identify a predefined instructions sequence, wherein the instruction sequence is assigned to solution S that is identified by inference module 340.

FIG. 15 illustrates a simplified block diagram of exemplary computer system 999 in general for that the present invention can be implemented. System 999 has a plurality of computers 900, 901, 902 (or even more). Computer 900 can communicate with computers 901 and 902 over network 990. Computer 900 has processor 910, memory 920, bus 930, and, optionally, input device 940 and output device 950 (I/O devices, user interface 960). As illustrated, the invention is implemented by computer program product 100 (CPP), carrier 970 and signal 980.

In respect to computer 900, computer 901/902 is sometimes referred to as "remote computer", computer 901/902 is, for example, a server, a peer device or other common network node, and typically has many or all of the elements described relative to computer 900.

Computer 900 is, for example, a conventional personal computer. (PC), a desktop device or a hand-held device, a multiprocessor computer, a pen computer, a microprocessor-based or programmable consumer electronics device, a mini-computer, a mainframe computer, a personal mobile computing device, a mobile phone, a portable or stationary personal computer, a palmtop computer or the like.

Processor 910 is, for example, a central processing unit (CPU), a micro-controller unit (MCU), digital signal processor (DSP), or the like.

Memory 920 is elements that temporarily or permanently store data and instructions. Although memory 920 is illustrated as part of computer 900, memory can also be implemented in network 990, in computers 901/902 and in processor 910 itself (e.g., cache, register), or elsewhere. Memory 920 can be a read only memory (ROM), a random access memory (RAM), or a memory with other access options. Memory 920 is physically implemented by computer-readable media, for example: (a) magnetic media, like a hard disk, a floppy disk, or other magnetic disk, a tape, a cassette tape; (b) optical media, like optical disk (CD-ROM, digital versatile disk—DVD); (c) semiconductor media, like DRAM, SRAM, EPROM, EEPROM, memory stick.

Optionally, memory 920 is distributed. Portions of memory 920 can be removable or non-removable. For reading from media and for writing in media, computer 900 uses well-known devices, for example, disk drives, or tape drives.

Memory 920 stores modules such as, for example, a basic input output system (BIOS), an operating system (OS), a program library, a compiler, an interpreter, and a text-processing tool. Modules are commercially available and can be installed on computer 900. For simplicity, these modules are not illustrated.

CPP 100 has program instructions and—optionally—data that cause processor 910 to execute method steps of the present invention. In other words, CPP 100 can control the operation of computer 900 and its interaction in network system 999 so that is operates to perform in accordance with the invention. For example and without the intention to be limiting, CPP 100 can be available as source code in any programming language, and as object code ("binary code") in a compiled form.

Although CPP 100 is illustrated as being stored in memory 920, CPP 100 can be located elsewhere. CPP 100 can also be embodied in carrier 970.

Carrier 970 is illustrated outside computer 900. For communicating CPP 100 to computer 900, carrier 970 is conveniently inserted into input device 940. Carrier 970 is implemented as any computer readable medium, such as a medium largely explained above (cf. memory 920). Generally, carrier 970 is an article of manufacture having a computer readable medium with computer readable program code to cause the computer to perform methods of the present invention. Further, signal 980 can also embody computer program product 100.

Having described CPP 100, carrier 970, and signal 980 in connection with computer 900 is convenient. Optionally, further carriers and further signals embody computer program products (CPP) to be executed by further processors in computers 901 and 902.

Input device 940 provides data and instructions for processing by computer 900. Device 940 can be a keyboard, a pointing device (e.g., mouse, trackball, cursor direction keys), microphone, joystick, game pad, scanner, or disc drive. Although the examples are devices with human interaction, device 940 can also be a device without human interaction, for example, a wireless receiver (e.g., with satellite dish or terrestrial antenna), a sensor (e.g., a thermometer), a counter (e.g., a goods counter in a factory). Input device 940 can serve to read carrier 970.

Output device 950 presents instructions and data that have been processed. For example, this can be a monitor or a display, (cathode ray tube (CRT), flat panel display, liquid crystal display (LCD), speaker, printer, plotter, vibration alert device. Output device 950 can communicate with the user, but it can also communicate with further computers.

Input device 940 and output device 950 can be combined to a single device. Any device 940 and 950 can be provided optional.

Bus 930 and network 990 provide logical and physical connections by conveying instruction and data signals. While connections inside computer 900 are conveniently referred to as "bus 930", connections between computers 900-902 are referred to as "network 990". Optionally, network 990 includes gateways which are computers that specialize in data transmission and protocol conversion.

Devices 940 and 950 are coupled to computer 900 by bus 930 (as illustrated) or by network 990 (optional). While the signals inside computer 900 are mostly electrical signals, the signals in network are electrical, electromagnetic, optical or wireless (radio) signals.

Networks are commonplace in offices, enterprise-wide computer networks, intranets and the Internet (e.g., world wide web). Network 990 can be a wired or a wireless network. To name a few network implementations, network 990 can be, for example, a local area network (LAN), a wide area network (WAN), a public switched telephone network (PSTN); a Integrated Services Digital Network (ISDN), an infra-red (IR) link, a radio link, like Universal Mobile Telecommunications System (UMTS), Global System for Mobile Communication (GSM), Code Division Multiple Access (CDMA), or satellite link.

A variety of transmission protocols, data formats and conventions is known, for example, as transmission control protocol/internet protocol (TCP/IP), hypertext transfer protocol (HTTP), secure HTTP, wireless application protocol (WAP), unique resource locator (URL), a unique resource identifier (URI), hypertext markup language (HTML), extensible markup language (XML), extensible hypertext markup language (XHTML), wireless markup language (WML), Standard Generalized Markup Language (SGML).

Interfaces coupled between the elements are also well known in the art. For simplicity, interfaces are not illustrated. An interface can be, for example, a serial port interface, a parallel port interface, a game port, a universal serial bus (USB) interface, an internal or external modem, a video adapter, or a sound card.

Computer and program are closely related. As used hereinafter, phrases, such as "the computer provides" and "the program provides", are convenient abbreviation to express actions by a computer that is controlled by a program.

REFERENCES 1000 user
1001 knowledge engineer
1002 service engineer
200 main system
200/300 computer system
210, 201 first, second main systems
210 relational database
220 application server
230 front-end server
300 auxiliary system
310 service module
320 acquisition module
322 tree
330 knowledge module
331 lexicon
340 inference module
500 service system
500 service system
510 service module
520 acquisition module
530 knowledge module
540 inference module
A application
C control instructions
D data
P problem
Pa parameter
R knowledge representations
S solution
S/S system/system
U/S user/system
XX queries; query results; X=0 . . . 9

The invention claimed is:

1. A computer system comprising:
a main system that executes an application in cooperation with a human user;
an auxiliary system to evaluate problems in the main system using a service module to collect problem related data from the main system, wherein the auxiliary system determines a context of the evaluated problems and distinguishes versions of the main system;
a knowledge module that stores knowledge representations by classifying the knowledge representations into context groups, wherein,
each context group is classified according to at least one predefined context,
the knowledge representations comprise entries for specific problem symptoms and corresponding solutions,
the knowledge module distinguishes the context with a primary context and a secondary context, with the secondary context referenced from the primary context, and
the knowledge module makes knowledge representations selectively available or non-available according to a selected context;
an inference module that processes problem related data with knowledge representations where the context of the evaluated problems is used to select at least one context group of the knowledge representations to identify solutions, wherein the inference module forwards the solutions through the service module to the main system.

2. The computer system of claim 1, wherein the auxiliary system distinguishes context and versions relating to the application.

3. The computer system of claim 2, wherein the auxiliary system distinguishes context and versions by using a check lexicon in the knowledge module.

4. The computer system of claim 3, wherein the check lexicon lists details for the knowledge representations, wherein the details depend on a version of the main system.

5. The computer system of claim 3, wherein the check lexicon lists details for the knowledge representations, wherein the details depend on a version of the application.

6. The computer system of claim 3, wherein the check lexicon lists details for the knowledge representations, wherein the details depend on the context of the problem.

7. The computer system of claim 3, wherein the check lexicon lists details for the knowledge representations that depend on a version of the main system.

8. The computer system of claim 3, wherein the check lexicon uses parameters for versions and context.

9. A computer system comprising:
- a main system that executes an application in cooperation with a human user;
- an auxiliary system to evaluate problems in the main system using a service module to collect problem related data from the main system, wherein the auxiliary system determines a context of the evaluated problems and distinguishes versions of the main system;
- a knowledge module that stores knowledge representations by classifying the knowledge representations into context groups, wherein each context group is classified according to at least one predefined context, wherein the knowledge representations comprise entries for specific problem symptoms and corresponding solutions, and wherein the knowledge module makes knowledge representations selectively available or non-available according to a selected context; and
- an inference module that processes problem related data with knowledge representations where the context of the evaluated problems is used to select at least one context group of the knowledge representations to identify solutions, wherein the inference module forwards the solutions through the service module to the main system.

10. The computer system of claim 9, wherein the auxiliary system distinguishes context and versions relating to the application.

11. The computer system of claim 10, wherein the auxiliary system distinguishes context and versions by using a check lexicon in the knowledge module.

12. The computer system of claim 11, wherein the check lexicon lists details for the knowledge representations, wherein the details depend on a version of the main system.

13. The computer system of claim 11, wherein the check lexicon lists details for the knowledge representations, wherein the details depend on a version of the application.

14. The computer system of claim 11, wherein the check lexicon lists details for the knowledge representations, wherein the details depend on the context of the problem.

15. The computer system of claim 11, wherein the check lexicon lists details for the knowledge representations that depend on a version of the main system.

16. The computer system of claim 11, wherein the check lexicon uses parameters for versions and context.

\* \* \* \* \*